G. C. ABBE.
CAR BODY.
APPLICATION FILED NOV. 27, 1917.

1,259,192.

Patented Mar. 12, 1918.
4 SHEETS—SHEET 1.

Inventor:—
George C. Abbe, by his Attorneys:
Howson & Howson

G. C. ABBE.
CAR BODY.
APPLICATION FILED NOV. 27, 1917.
1,259,192.
Patented Mar. 12, 1918.
4 SHEETS—SHEET 2.
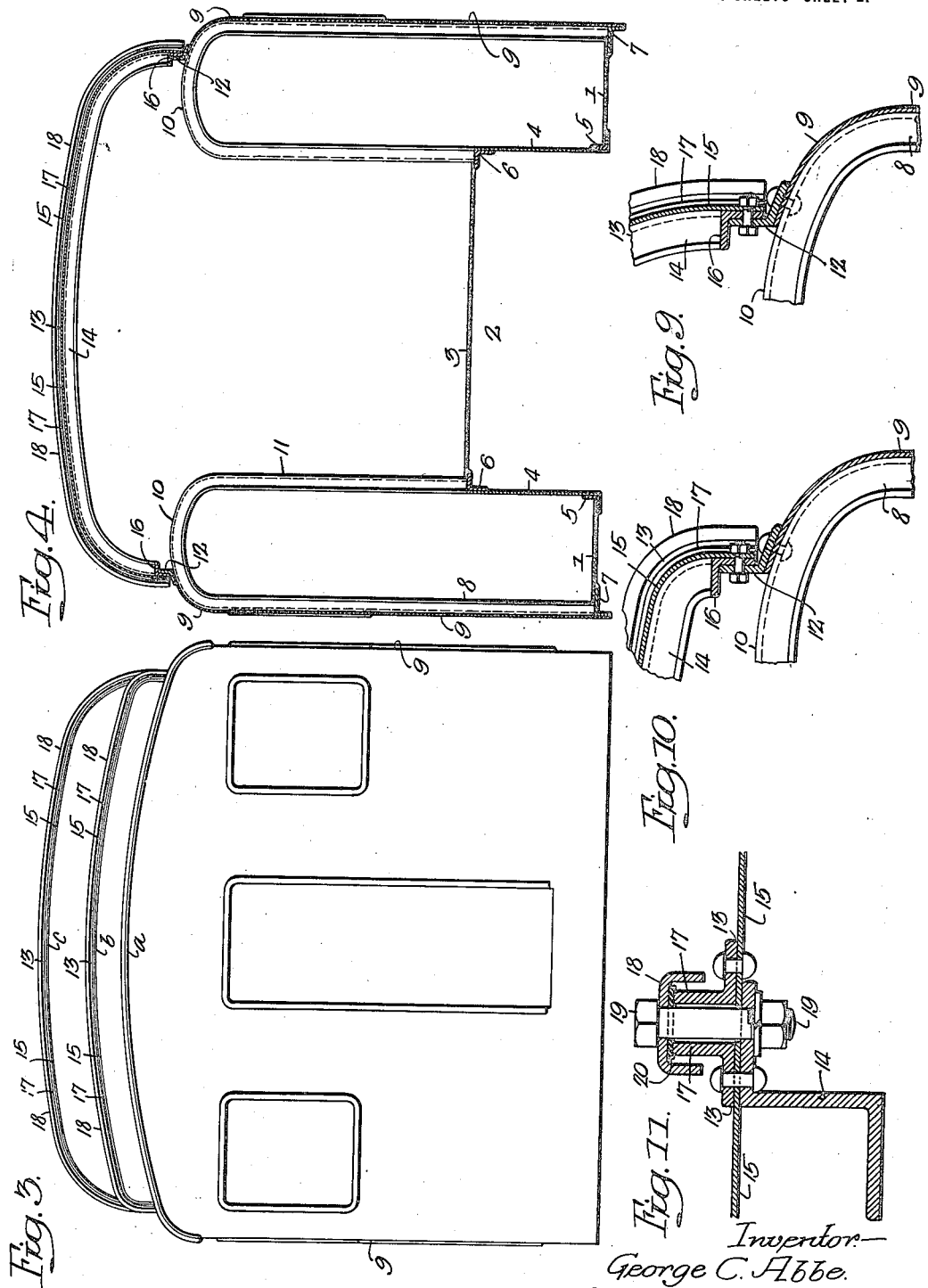

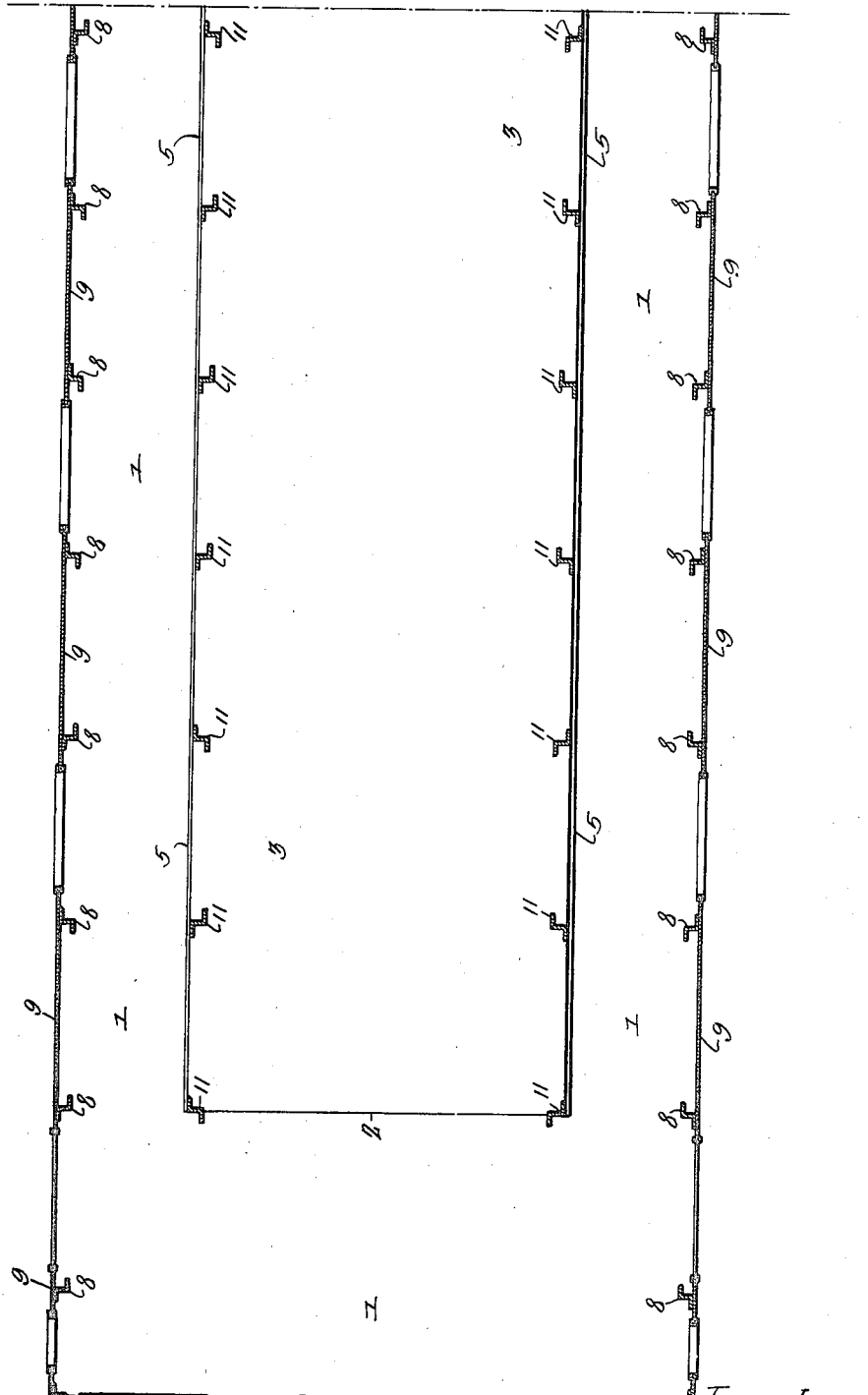

G. C. ABBE.
CAR BODY.
APPLICATION FILED NOV. 27, 1917.
1,259,192.
Patented Mar. 12, 1918.
4 SHEETS—SHEET 4.
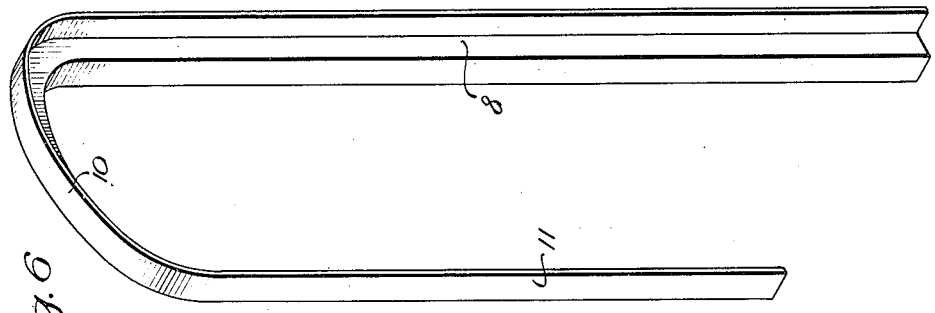
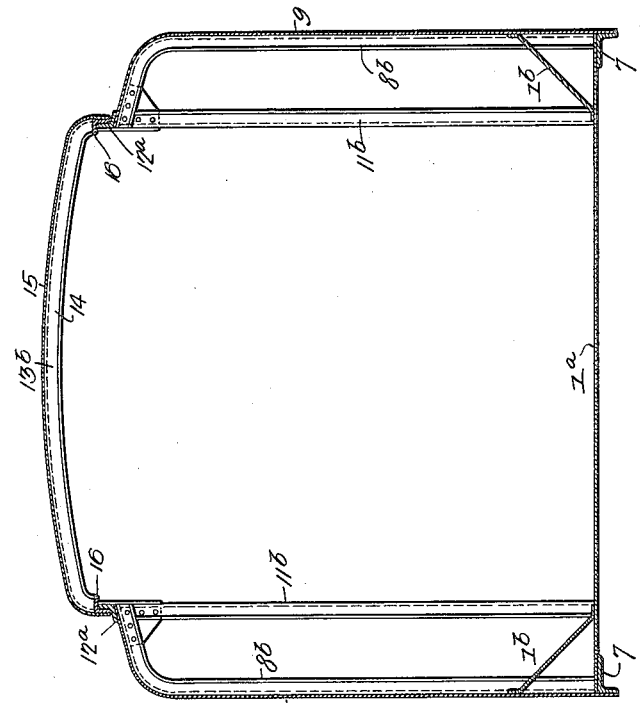
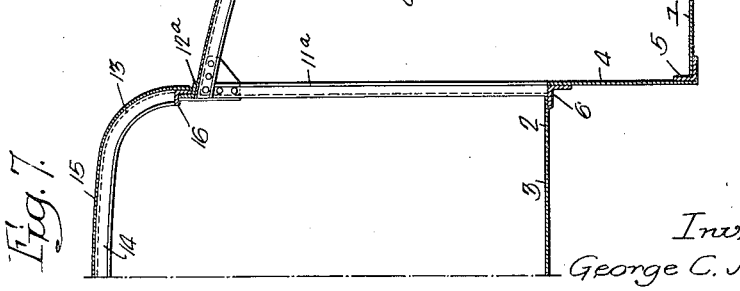
Inventor—
George C. Abbe.
by his Attorneys—
Hoover & Hoover.

UNITED STATES PATENT OFFICE.

GEORGE C. ABBE, OF LANSDOWNE, PENNSYLVANIA, ASSIGNOR TO THE BALDWIN LOCOMOTIVE WORKS, OF PHILADELPHIA, PENNSYLVANIA, A CORPORATION OF PENNSYLVANIA.

CAR-BODY.

1,259,192.  Specification of Letters Patent.  Patented Mar. 12, 1918.

Application filed November 27, 1917. Serial No. 204,215.

*To all whom it may concern:*

Be it known that I, GEORGE C. ABBE, a citizen of the United States, and a resident of Lansdowne, county of Delaware, State of Pennsylvania, have invented certain Improvements in Car-Bodies, of which the following is a specification.

My invention relates to certain improvements in car bodies, particularly the bodies of electric railway locomotives which inclose certain of the electric mechanisms.

While the invention is particularly adapted for use in connection with electric locomotives, it will be understood that it can be applied to other types of cars where it is desirable to gain access to the interior of the car from the top.

One object of the invention is to design the car body so that a portion of the roof can be removed without interfering with the stability of the side frames of the car.

A further object of the invention is to design the car so that the uprights, which support the sheathing forming the sides of the car, also form supports for the fixed portion of the roof and are extended to form brace members which stiffen the car sides so that the sides will be rigid when the detached portion of the roof has been removed.

My invention also relates to further details which will be fully described hereinafter.

In the accompanying drawings:—

Fig. 3, is an end view;

Fig. 4, is a sectional view on the line 4—4, Fig. 2;

Fig. 5, is a sectional plan view on the line 5—5, Fig. 2;

Fig. 6, is a detached perspective view of one of the upright supports for the sides of the car;

Fig. 7, is a sectional view illustrating a modification;

Fig. 8, is a sectional view illustrating my invention as applied to an ordinary freight car of the box type;

Figs. 9 and 10, are enlarged views showing details of the means for detachably securing the roof structure to the side supports; and Fig. 11, is an enlarged sectional view showing the weather tight joint between the several plates that make up the detachable roof.

Figures 1, 2:
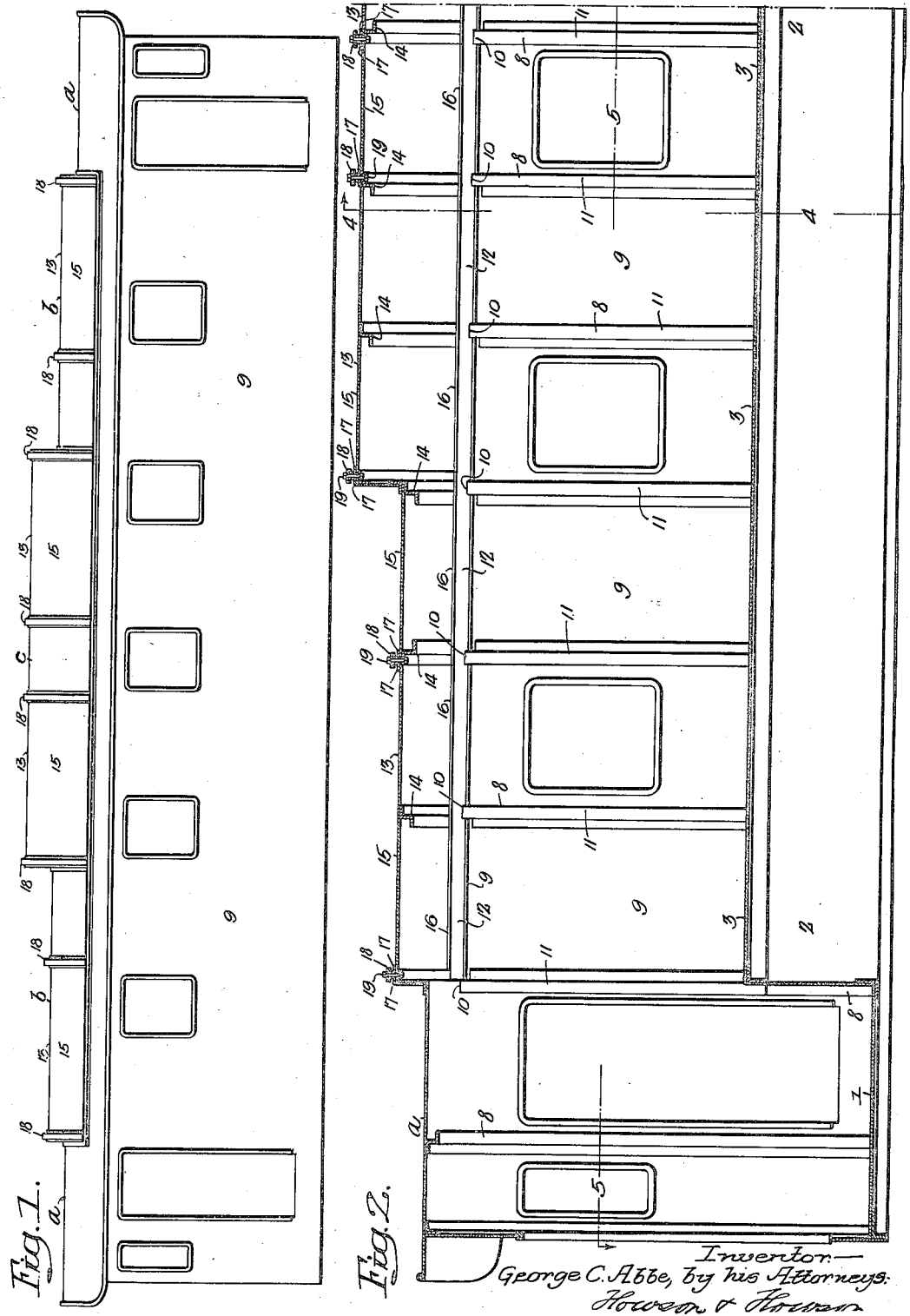
Figure 1, is a side elevation of the body of an electric locomotive illustrating my invention.
Fig. 2, is a longitudinal sectional view of a portion of the body illustrated in Fig. 1.

In the drawings I have omitted the end framework of the locomotive, as the invention relates solely to the body portion.

The car body has a floor 1 and a raised portion 2. The floor 3 of this raised portion forms a support for the electric mechanism, in the present instance, which controls the motors usually mounted on the trucks supporting the car body. The floor of this raised portion is supported by a girder consisting of a plate 4 and angle bars 5 and 6, the angle bars 5 connecting the bottom of the girders with the lower floor 1, and the bars 6 connecting the top of the girders with the upper floor 3. At each side of the car at the floor 1 is a heavy angle girder 7.

Spaced a given distance throughout the length of the car at each side thereof is a series of U-shaped girders, each consisting of an outer upright having its lower end attached to the floor, or girder 7 and an upright 11, which is attached to the angle bar 6 at the upper floor 3. These two uprights are connected by the roof support 10 and, as shown in Figs. 3 and 6, this U-shaped girder is made in a single piece bent to form two uprights and the connecting roof support. This construction forms a very stiff support for the side plates 9, which inclose the car body and which are secured to the outer set of uprights 8.

Carried by the roof support is an angle bar 12, which extends throughout the length of the open space of the car and attached to this angle bar at each side of the car is the detachable roof structure 13, which consists of a series of angle bars 14 and roof plates 15, and at each lower edge of the roof structure 13 is an angle plate 16, which is detachably secured by bolts to the angle plate 12 of the side supporting uprights. The roof structure is made preferably in three heights, or portions *a*, *b* and *c*. At each end of the car is a fixed portion above the driver's station and the removable sections *b*, *b* are slightly higher than the sections *a*, and the central section *c*, in the present instance, is still higher. This arrangement enables me to vary the height of the roof to accommodate the various mechanisms located within the car body.

It will be understood that this arrangement of detachable roof sections for the car may be modified, depending considerably upon the character of the mechanism located within the car body.

The side plates 9, in the present instance, extend over the rounded upper edge of the frame and to the angle plates 12. These plates form a portion of the roof.

In the modification illustrated in Fig. 7, I have shown the uprights 8ª discontinued at the angle bars 12ª and a separate upright 11ª extending from the angle plate to the raised floor structure 3. In this instance, the angle plate 12ª is located at the inner edge of the fixed roof directly above the uprights 11ª.

In Fig. 8, I have illustrated my invention as applied to a freight car, the uprights 8ᵇ being formed as shown in Fig. 7, the inner ends being supported by uprights 11ᵇ, and the detachable roof structure 13ᵇ is carried by this framework, but, in this instance, the floor 1ª is not elevated and, if this be applied to a grain car, then there are angle filler plates 1ᵇ at each side, so that in the case of grain, or other material which flows, and which is loaded in bulk, the grain will flow toward the center of the car as the load is removed.

By this construction, the roof of the car can be removed and a bucket elevator or hoist, depending upon the material, can be passed through the roof and the contents of the car removed through the opening.

In Fig. 11, I have shown one form of joint between the several plates forming the sectional roof of the car illustrated in Fig. 1, and in this instance there are two uprights 17 to which the plates 15 are secured and these are, in turn, secured to braces or carlines 14, and U-shaped cover plates 18 extend over the two flanges of the angles and are secured to the roof by bolts 19. Between these U-shaped plates and the angles is a strip of fiber, or other suitable material 20, making the joint waterproof.

By making the length of the opening in the roof the car body less than the length of the car, I strengthen the frame for the car body, as the two end sections form rigid frames extending from one side of the car to the other, so that the car body is a rectangular structure braced at both sides and at both ends, and when the roof is removed the structure is self-supporting, owing to the rigid framework.

I claim:—

1. The combination in a car body, of a floor; a series of transverse U-shaped girders extending on each side of the car body; side plates secured to the outer portion of the U-shaped girders; and a roof structure mounted on and supported by the girders.

2. The combination in a car body of a floor; a series of U-shaped girders arranged transversely at each side of the car and extending substantially the full length of the car; girders at the ends of the car extending from one side of the car to the other, the plates forming the side of the car being secured to the uprights of the girders; and a removable roof structure carried by the series of U-shaped girders.

3. The combination in a car body, of a floor having a raised central portion; a series of uprights spaced apart and extending from the outer edge of the floor at each side of the car; a second series of uprights spaced apart and extending from the edge of the raised portion of the floor, said uprights at each side being connected together at the upper end; side plates secured to said uprights; and a removable roof structure detachably mounted on said uprights.

4. The combination in a car body, of a floor having a central raised portion less in width than the width of the car and less in length than the length of the car; a series of U-shaped girders forming uprights and located at each side of the car, the outer series of uprights being arranged at the main floor and the inner series being arranged at the edge of the raised floor, the end uprights being connected together by roof beams extending across the car; side plates and roof plates secured to the several beams, leaving a clear opening at the center directly above the raised portion of the floor; and a roof structure mounted on the said beams.

5. The combination in a car body, of a floor having a central raised portion supported at each side by a beam consisting of two angle bars and a plate, the lower beams being secured to the lower floor plates of the car, the upper beams being secured to the upper floor plates of the car; a U-shaped member forming two uprights and an upper connecting member, one of said uprights extending to the lower floor level and the lower beam terminating at the upper floor level; a longitudinal beam at each side of the car supported on said U-shaped members; and a roof structure removably secured to said beams.

6. The combination in a car body, of a floor; a series of inner and outer uprights at each side of the car connected by an upper cross member; a bar carried by the uprights and extending the length of the opening in the roof of the car; and a detachable roof section secured to the bar.

7. The combination in a car body, of a floor; a series of inner and outer uprights at each side of the car; a fixed roof supported by the uprights, said roof having an opening; a series of transverve sections covering the opening and secured to the uprights, each section having an angle bar at each edge; and an overlapping channel plate extending over the flanges of the two angle bars and forming a water-tight joint.

8. The combination in a car body, of a floor; two series of uprights at each side, said uprights being formed of shaped bars and connected at their upper edges and forming the supports of the roof structure, the uprights at each end of the car having upper connections extending from one side of the car to the other; side plates secured to the uprights at each side of the car and permanent roof plates at each end of the car and at the side, leaving an opening at the top; a longitudinal angle bar at each side of the bar supported on the uprights; and a detachable roof consisting of a series of sections secured to the angle bars.

In witness whereof I affix my signature.

GEO. C. ABBE.